United States Patent
Nakamoto et al.

(10) Patent No.: US 10,674,275 B2
(45) Date of Patent: *Jun. 2, 2020

(54) ELECTROACOUSTIC TRANSDUCER AND DISPLAY APPARATUS

(71) Applicant: PANASONIC INTELLECTUAL PROPERTY MANAGEMENT CO., LTD., Osaka (JP)

(72) Inventors: Senri Nakamoto, Osaka (JP); Yukiharu Wakiguchi, Osaka (JP); Katsuhiko Kotsugi, Osaka (JP); Kazutaka Goto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,480

(22) Filed: Jun. 6, 2019

(65) Prior Publication Data
US 2019/0289402 A1    Sep. 19, 2019

Related U.S. Application Data

(63) Continuation of application No. 16/068,103, filed as application No. PCT/JP2016/005232 on Dec. 27, 2016, now Pat. No. 10,492,006.

(30) Foreign Application Priority Data

Jan. 15, 2016  (JP) .................................. 2016-006540

(51) Int. Cl.
*H04R 1/02*  (2006.01)
*H04R 9/06*  (2006.01)
(Continued)

(52) U.S. Cl.
CPC ................. *H04R 9/06* (2013.01); *H04R 1/00* (2013.01); *H04R 1/021* (2013.01); *H04R 1/025* (2013.01);
(Continued)

(58) Field of Classification Search
CPC ........ H04R 1/08; H04R 3/00; H04R 2420/07; H04R 2420/09; H04R 9/06; H04R 1/00;
(Continued)

(56) References Cited

U.S. PATENT DOCUMENTS

2006/0239478 A1  10/2006  Mouri et al.
2011/0293131 A1  12/2011  Kobayashi et al.
(Continued)

FOREIGN PATENT DOCUMENTS

GB    1219919 A     1/1971
JP    06-327079 A  11/1994
(Continued)

OTHER PUBLICATIONS

The Extended European Search Report dated Nov. 6, 2018 for the related European Patent Application No. 16884861.2.
(Continued)

*Primary Examiner* — Ammar T Hamid
(74) *Attorney, Agent, or Firm* — McDermott Will & Emery LLP

(57) ABSTRACT

An electroacoustic transducer includes: a diaphragm; a frame that is disposed around the diaphragm so as to surround the diaphragm; an edge that closes a space between the diaphragm and the frame in a manner of forming a membrane so as to connect the diaphragm and the frame; a base body that supports the frame and has a through sound output hole in front of the diaphragm; a magnet that is attached to the frame; and a voice coil body that is attached to the diaphragm. The frame has an annular first fitting
(Continued)

portion that is disposed around the diaphragm so as to surround the diaphragm. The base body has a second fitting portion that fits with the first fitting portion. The electroacoustic transducer further includes a sealing member that is made of a thermoplastic substance and seals a space between the first fitting portion and the second fitting portion fitted with each other.

11 Claims, 8 Drawing Sheets

(51) Int. Cl.

| | | |
|---|---|---|
| *H04R 1/06* | (2006.01) | |
| *H04R 9/00* | (2006.01) | |
| *H04R 9/02* | (2006.01) | |
| *H04R 7/22* | (2006.01) | |
| *H04R 1/00* | (2006.01) | |
| *H04R 1/34* | (2006.01) | |
| *H04R 7/18* | (2006.01) | |
| *H04R 9/04* | (2006.01) | |
| *H04R 7/20* | (2006.01) | |
| *H04N 5/64* | (2006.01) | |

(52) U.S. Cl.
CPC ............... *H04R 1/06* (2013.01); *H04R 1/345* (2013.01); *H04R 7/18* (2013.01); *H04R 7/20* (2013.01); *H04R 7/22* (2013.01); *H04R 9/00* (2013.01); *H04R 9/02* (2013.01); *H04R 9/025* (2013.01); *H04R 9/04* (2013.01); *H04N 5/642* (2013.01); *H04R 2400/11* (2013.01); *H04R 2499/15* (2013.01)

(58) Field of Classification Search
CPC .......... H04R 1/021; H04R 1/025; H04R 1/06; H04R 1/345; H04R 7/18; H04R 7/20; H04R 7/22; H04R 9/00; H04R 9/02; H04R 9/025; H04R 9/04; H04R 2400/11; H04R 2499/15; H01Q 1/273; H04N 5/642
USPC ............................ 381/111, 92, 122, 333, 91
See application file for complete search history.

(56) References Cited

U.S. PATENT DOCUMENTS

| | | |
|---|---|---|
| 2012/0008805 A1 | 1/2012 | Hachinohe et al. |
| 2014/0112512 A1 | 4/2014 | Su et al. |
| 2019/0020955 A1 | 1/2019 | Nakamoto et al. |

FOREIGN PATENT DOCUMENTS

| | | | |
|---|---|---|---|
| JP | 7-025695 U | | 5/1995 |
| JP | 2005-129992 A | | 5/2005 |
| JP | 2006-327079 A | | 12/2006 |
| JP | 2008-278146 A | | 11/2008 |
| JP | 2010-056493 A | | 3/2010 |
| JP | 2010-147924 A | | 7/2010 |
| JP | 2011-142502 A | | 7/2011 |
| JP | 2012-191579 A | | 10/2012 |
| JP | 2012191579 A | * | 10/2012 |
| JP | 2013/089878 A | | 5/2013 |
| JP | 2014-082534 A | | 5/2014 |
| JP | 2014-131243 A | | 7/2014 |
| JP | 2019-195187 A | | 11/2019 |
| JP | 2019-195188 A | | 11/2019 |
| WO | 2017/122257 A1 | | 7/2017 |

OTHER PUBLICATIONS

International Search Report of PCT application No. PCT/JP2016/005232 dated Feb. 21, 2017; with English translation.
Non-Final Office Action issued in U.S. Appl. No. 16/068,103, dated Jan. 31, 2019.

* cited by examiner

ELECTROACOUSTIC TRANSDUCER AND DISPLAY APPARATUS

CROSS-REFERENCE OF RELATED APPLICATIONS

This application is a Continuation of U.S. patent application Ser. No. 16/068,103, filed on Jul. 3, 2018, which is the U.S. National Phase under 35 U.S.C. § 371 of International Patent Application No. PCT/JP2016/005232, filed on Dec. 27, 2016, which in turn claims the benefit of Japanese Application No. 2016-006540, filed on Jan. 15, 2016, the entire disclosures of which applications are incorporated by reference herein.

TECHNICAL FIELD

The present disclosure relates to an electroacoustic transducer that converts electric signals into sounds or converts sounds into electric signals, such as a loudspeaker and a microphone. Particularly, the present disclosure relates to an electroacoustic transducer having waterproof performance.

BACKGROUND ART

An electroacoustic transducer such as a loudspeaker or a microphone that is used outdoors, in bathrooms, or watersides must have waterproof performance and dustproof performance.

For example, PTL 1 discloses a technique of suppressing a reduction in the acoustic characteristic by covering the front side of a speaker with a special film, while securing the waterproof performance.

With such an electroacoustic transducer having waterproof performance, the waterproof performance is secured by clamping a rubber gasket between a frame and a base body, and compressing the rubber gasket by tightening with tightening members. Further, in order to ensure the waterproof performance, an adhesive agent or a waterproof double-sided tape connects between the rubber gasket and the frame and between the rubber gasket and the base body.

CITATION LIST

Patent Literature

PTL 1: Unexamined Japanese Patent Publication No. 2014-82534

SUMMARY

The present disclosure provides an electroacoustic transducer capable of securing waterproof performance with a simple structure, and a display apparatus including the electroacoustic transducer.

An electroacoustic transducer of the present disclosure is an electroacoustic transducer that converts an electric signal into a sound and vice versa. The electroacoustic transducer includes: a diaphragm; a frame that is disposed around the diaphragm so as to surround the diaphragm; an edge that closes a space between the diaphragm and the frame in a manner of forming a membrane so as to connect the diaphragm and the frame; a base body that supports the frame and has a through sound output hole in front of the diaphragm; a magnet that is attached to the frame; and a voice coil body that is attached to the diaphragm. The frame has an annular first fitting portion that is disposed around the diaphragm so as to surround the diaphragm. The base body has a second fitting portion that fits with the first fitting portion. The electroacoustic transducer further includes a sealing member that is made of a thermoplastic substance and seals a space between the first fitting portion and the second fitting portion fitted with each other.

According to the present disclosure, an electroacoustic transducer having waterproof performance can be implemented with a simple structure, and a display apparatus including the electroacoustic transducer can be provided.

BRIEF DESCRIPTION OF THE DRAWINGS

FIG. 3 is a cross-sectional view of the loudspeaker taken along line A-A in

FIG. 2.

DESCRIPTION OF EMBODIMENTS

A description will be given of exemplary embodiments of an electroacoustic transducer of the present disclosure with reference to the drawings. Note that, the following exemplary embodiments are merely examples of the electroacoustic transducer of the present disclosure. Accordingly, the scope of the present disclosure is defined by the language of claims with reference to the following exemplary embodiments, and the present disclosure is not limited to the following exemplary embodiments. Hence, of these constituents in the exemplary embodiments, the constituents not disclosed in the independent claims representing the broadest concept of the present disclosure are described to be structuring a preferable mode, while they are not necessarily essential for achieving the object of the present disclosure.

Further, the drawings are schematic drawings in which enhancement, omission, and adjustment of the proportion are made as appropriate for showing the present disclosure, and may differ from practical shape, positional relationship and proportion.

First Exemplary Embodiment

In the present exemplary embodiment, a description is exemplarily given of loudspeaker 100 being one type of electroacoustic transducers.

1-1. Structure

Figure 1:
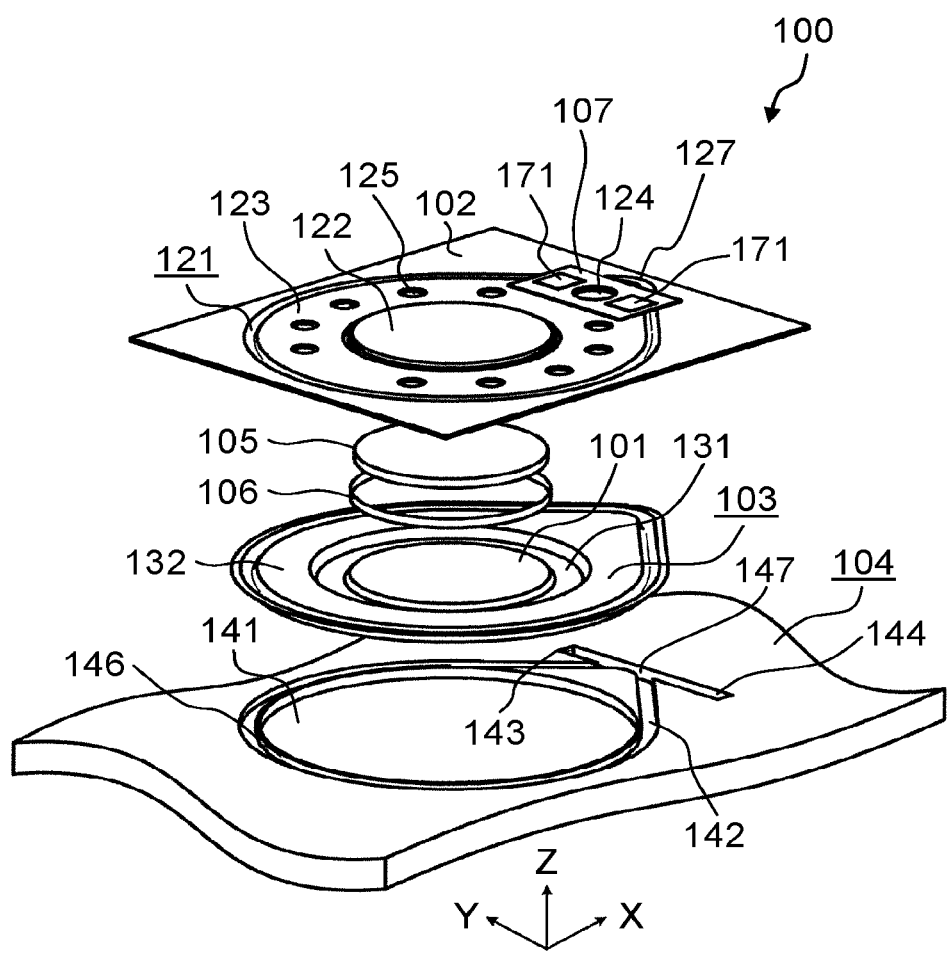
FIG. 1 is an exploded perspective view of an exemplary loudspeaker according to a first exemplary embodiment.

FIG. 1 is an exploded perspective view of an exemplary loudspeaker according to a first exemplary embodiment.

Figure 2:
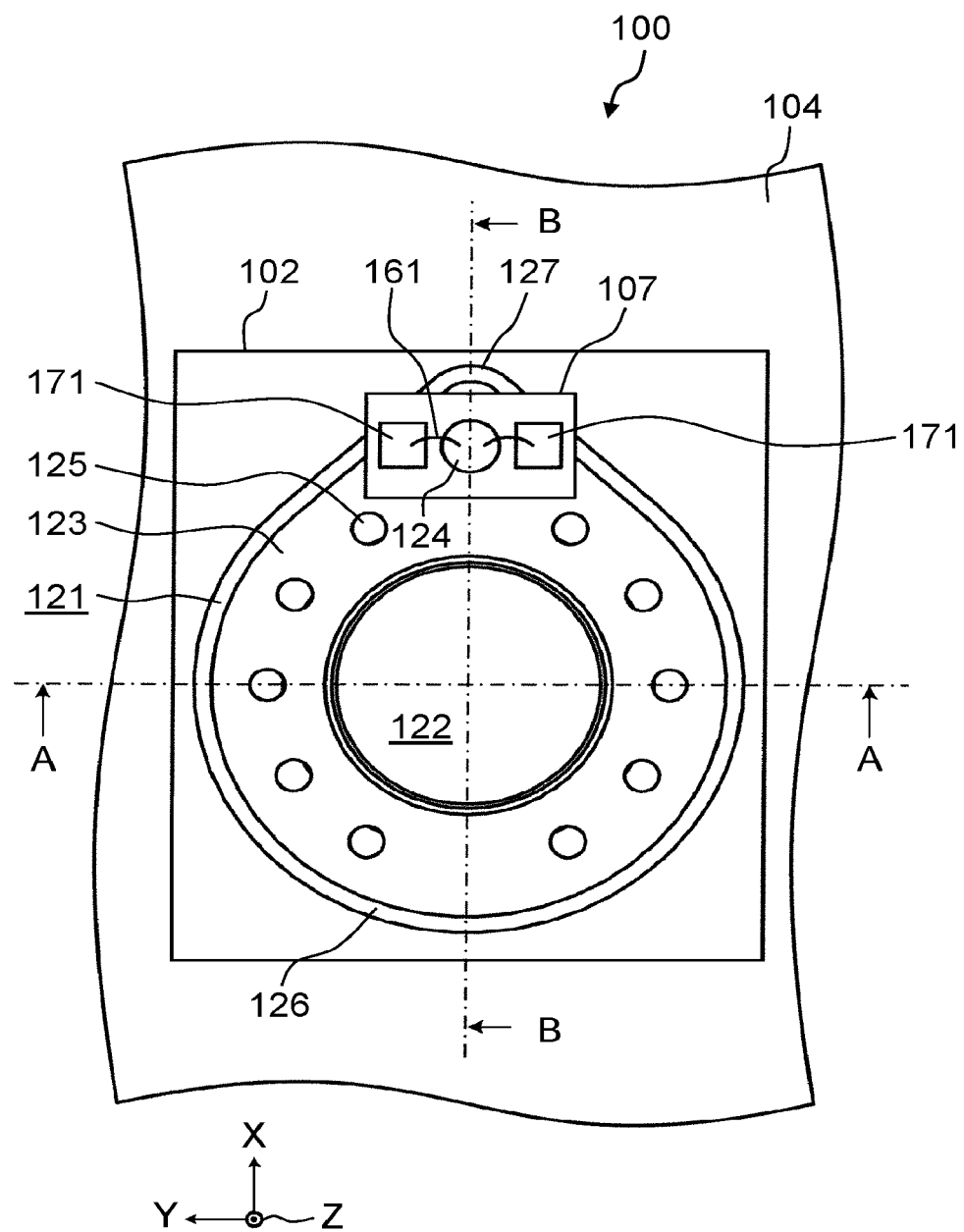
FIG. 2 is a plan view showing the exemplary loudspeaker according to the first exemplary embodiment as seen from the frame side.

FIG. 2 is a plan view showing the exemplary loudspeaker according to the first exemplary embodiment as seen from the frame side.

Figure 3:
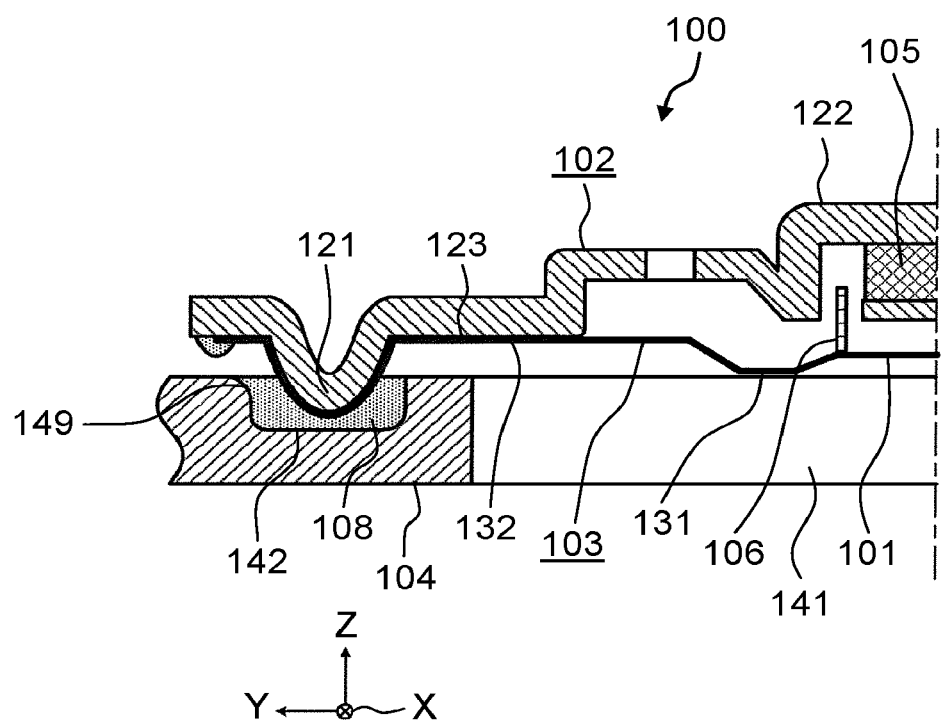

FIG. 3 is a cross-sectional view of the loudspeaker taken along line A-A in FIG. 2.

Figure 4:
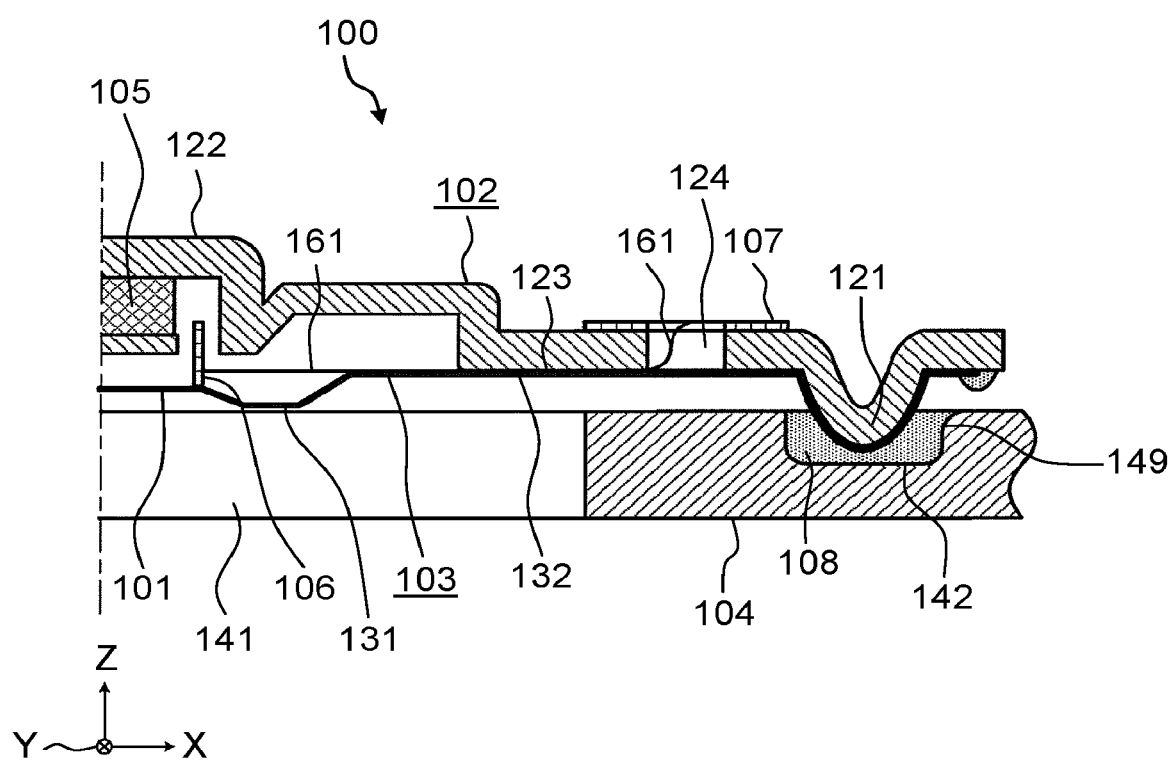
FIG. 4 is a cross-sectional view showing the distant portion side of the loudspeaker taken along line A-A in FIG. 2.

FIG. 4 is a cross-sectional view showing the distant portion side of the loudspeaker taken along line A-A in FIG. 2.

As shown in the drawings, loudspeaker 100 includes diaphragm 101, frame 102, edge 103, base body 104, magnet 105, and voice coil body 106. Loudspeaker 100 is an apparatus capable of emitting sounds into space based on input electric signals (audio signals).

Diaphragm 101 is a member that displaces in the front-rear direction (in the drawing, the Z-axis direction which is the thickness direction of diaphragm 101) with reference to the neutral position based on electric signals, thereby vibrating the air and generating sounds. In the present exemplary embodiment, diaphragm 101 is circular flat plate-like, which is smaller in thickness than a cone-shaped diaphragm. Thus, a reduction in thickness of the entire loudspeaker 100 can be achieved.

Further, on one side of diaphragm 101 that opposes to frame 102, voice coil body 106 is attached. Voice coil body 106 is a component that has its one end disposed in a magnetic gap which will be described later, and has its other end coupled to diaphragm 101. Voice coil body 106 is a component that generates a magnetic flux based on input electric signals thereby vibrating diaphragm 101 with interaction with magnet 105.

In the present exemplary embodiment, voice coil body 106 includes a bobbin and a coil wound around the bobbin. The bobbin is made of a material such as aluminum or resin.

The material constituting diaphragm 101 is not specifically limited, and may be, for example, polyethylene naphthalate resin. Note that, taking into consideration of the response characteristic, diaphragm 101 may include a hard and lightweight core member made of foamed resin or the like. Further, a reinforcing member layer made of such as aluminum, titanium, or carbon may be provided.

Further, the shape of diaphragm 101 is not limited to a circle, and diaphragm 101 may have any shape including a square, a rectangle, an oval, and an ellipse. Further, diaphragm 101 is not limited to be flat, and may be three-dimensional shape such as a cone shape.

Frame 102 is a structural member that is disposed so as to surround diaphragm 101. Frame 102 includes annular first fitting portion 121 disposed so as to surround diaphragm 101. In the present exemplary embodiment, frame 102 includes, on the inner side of first fitting portion 121, magnet holder 122 holding magnet 105, edge holder 123, and draw-out hole 124 through which lead wire 161 (see FIG. 2) connected to voice coil body 106 is drawn out (see FIGS. 2 and 4). Further, a plurality of through holes 125 disposed so as to surround magnet holder 122 are also provided.

In the present exemplary embodiment, in frame 102, first fitting portion 121, magnet holder 122, edge holder 123 and the like are integrally formed. Specifically, frame 102 is formed by subjecting sheet metal whose main component is iron, such as a zinc-plated steel plate, to pressing, so that first fitting portion 121, magnet holder 122, and edge holder 123 are integrally formed.

First fitting portion 121 is a portion that cooperates with second fitting portion 142 (described later) provided at base body 104 to prevent entry of liquid from the base body 104 side toward the back side of diaphragm 101. In the present exemplary embodiment, first fitting portion 121 is an annular projection projecting toward base body 104.

Specifically, in the present exemplary embodiment, first fitting portion 121 has a shape including outer circumferential portion 126 which is disposed along the circumference of diaphragm 101 at a position spaced apart by a first distance from the circumferential portion of diaphragm 101, and distant portion 127 which is disposed at a position spaced apart by a second distance longer than the first distance, by which second distance distant portion 127 is farther from diaphragm 101 than outer circumferential portion 126 is. That is, not the entire first fitting portion 121 is annularly shaped corresponding to the circumferential shape of diaphragm 101, and part of first fitting portion 121 is disposed at a position distanced from diaphragm 101.

In this manner, provision of distant portion 127 at part of first fitting portion 121 allows provision of simple draw-out hole 124 and the like, which allows lead wire 161 connected to voice coil body 106 to be arranged outside loudspeaker 100 without the necessity of providing a special waterproofing structure. Note that, to other surface of frame 102 being opposite to edge 103, electrode substrate 107 is attached. Electrode substrate 107 holds electrode 171 to which lead wire 161 drawn out from frame 102 is electrically connected.

Edge holder 123 is part of frame 102 that holds edge 103. In the present exemplary embodiment, edge holder 123 is disposed between the circumferential portion of diaphragm 101 and first fitting portion 121, and has an annular shape that corresponds to the circumferential shape of diaphragm 101. Further, edge holder 123 is disposed so that a clearance is formed between the inner circumference of edge holder 123 and the outer circumference of diaphragm 101 at a third distance, and has a holding surface which is in parallel to a sound output surface of diaphragm 101.

Magnet holder 122 is part of frame 102 that holds magnet 105 that generates magnetic force with which voice coil body 106 is driven. In the present exemplary embodiment, since magnet 105 has a circular cylindrical shape, magnet holder 122 has a bottomed tubular shape in which magnet 105 can be housed. Further, a magnetic gap into which voice coil body 106 is inserted is formed between magnet holder 122 and magnet 105. In this manner, magnet holder 122 of frame 102 and the magnet housed in magnet holder 122 structure a magnetic circuit.

Edge 103 closes the clearance between diaphragm 101 and edge holder 123 of frame 102 in a manner of forming a membrane. Edge 103 is a member that attaches diaphragm 101 to frame 102, and is a membrane-like member being flexible and resilient. Further, edge 103 includes annular bulging portion 131 that bulges to be a projection formed along the circumferential portion of diaphragm 101. Also in the case where diaphragm 101 largely vibrates, edge 103 allows the vibration by deformation of bulging portion 131.

In the present exemplary embodiment, edge 103 includes flat plane portion 132. Plane portion 132 is bonded to edge holder 123 of frame 102. Further, edge 103 is disposed to extend to a position outside first fitting portion 121 of frame 102. Edge 103 covers the entire annular first fitting portion 121.

Further, in the present exemplary embodiment, edge 103 and diaphragm 101 are integrally formed, and the integrally molded members form a membrane-like member having annular concave and convex. Thus, first fitting portion 121 of frame 102 and the inner side thereof are covered with integrated edge 103 and diaphragm 101, and attain the state where frame 102 is not exposed. Accordingly, frame 102 can be structured with a material being poor in chemical resistance or a rustproof performance, and flexibility in designing frame 102 improves. For example, in the present exemplary embodiment, frame 102 can be formed by integral work of sheet metal. Thus, simplifying the manufacture, reducing the costs, and reducing the weight of frame 102 can be easily attained.

Base body 104 is a structural member that supports frame 102 and has through sound output hole 141 in front of diaphragm 101. Base body 104 includes second fitting portion 142 that fits with first fitting portion 121. Base body 104 is, for example, a cabinet made of wood or resin that holds frame 102 at a predetermined position.

Second fitting portion 142 is a portion that cooperates with first fitting portion 121 (described later) provided at frame 102 to prevent entry of liquid from the base body 104 side toward the back side of diaphragm 101. In the present exemplary embodiment, second fitting portion 142 is an annular groove that opens toward frame 102.

Specifically, in the present exemplary embodiment, second fitting portion 142 has a shape that corresponds to first fitting portion 121. Second fitting portion 142 has a shape that includes outer circumferential portion 146 disposed along the circumference of diaphragm 101, and distant portion 147.

Further, for the purpose of facilitating manufacture, distant portion 147 of second fitting portion 142 is provided with starting end groove 143 and terminating end groove 144 so as to project from second fitting portion 142 and communicate with second fitting portion 142.

Further, loudspeaker 100 includes sealing member 108 (see FIG. 3) that seals a space between first fitting portion 121 and second fitting portion 142 fitted with each other. Sealing member 108 is made of a thermoplastic substance such as thermoplastic resin or thermoplastic rubber. In the present exemplary embodiment, sound output hole 141 of base body 104 is sealed by: edge 103 that is clamped along the entire circumference of first fitting portion 121 of frame 102 and second fitting portion 142 of base body 104; sealing member 108; and diaphragm 101 integrated with edge 103. Accordingly, entry of liquid such as water from sound output hole 141 toward magnet 105 side can be prevented.

Next, with reference to FIGS. 1 to 5, a description will be given of a method of manufacturing loudspeaker 100 being an electroacoustic transducer.

Figure 5:
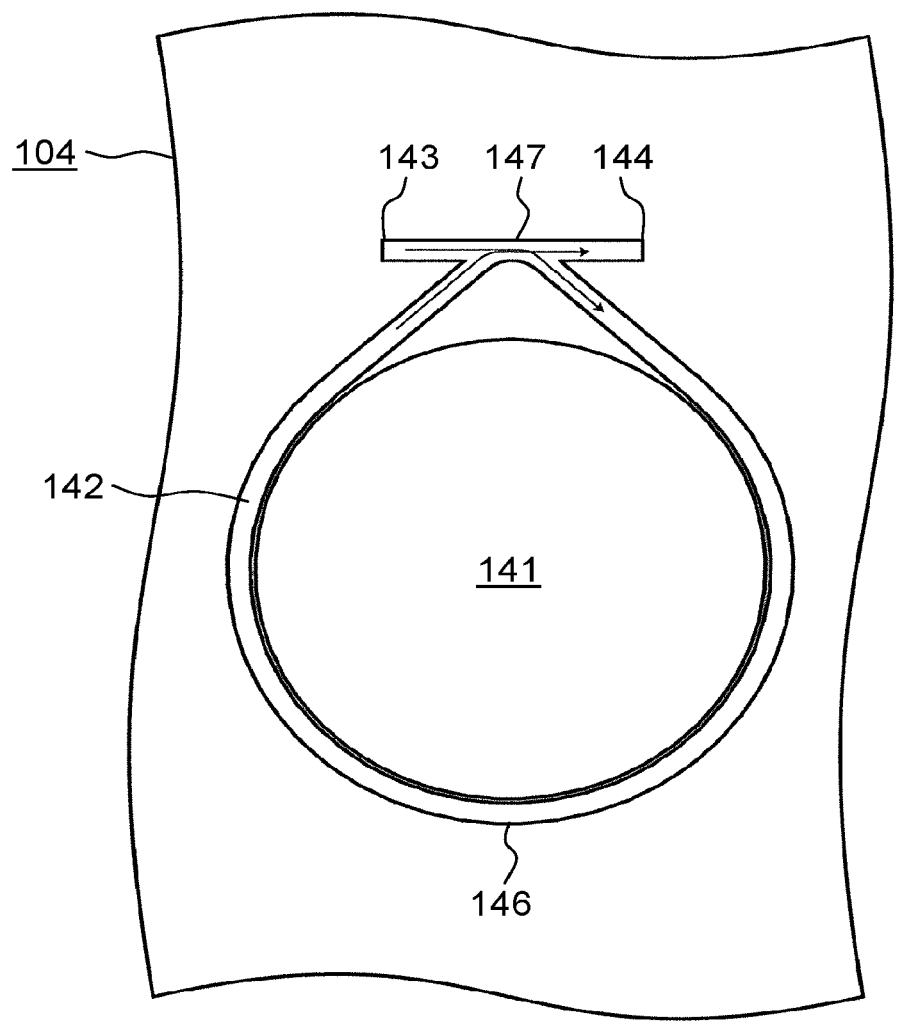
FIG. 5 is a plan view showing an exemplary second fitting portion of a base body according to the first exemplary embodiment.

FIG. 5 is a plan view showing an exemplary second fitting portion of the base body according to the first exemplary embodiment. FIG. 5 shows the flow of applying the sealing member.

Firstly, magnet 105 is attached to magnet holder 122 of frame 102. On the other hand, voice coil body 106 is attached to diaphragm 101 integrated with edge 103.

Next, lead wire 161 is arranged from voice coil body 106 to electrode substrate 107 outside frame 102 through drawout hole 124. Thereafter, edge 103 is disposed to cover the entire first fitting portion 121, and first fitting portion 121 and edge holder 123 are bonded to edge 103. Note that, as shown in FIGS. 3 and 4, since the outer circumference of edge 103 is prone to come unstack, the outer circumference of edge 103 may be reinforced with an adhesive agent. From the foregoing, a speaker unit is assembled.

Next, second fitting portion 142 of base body 104 is filled with molten sealing member 108. At this time, sealing member 108 is continuously applied into second fitting portion 142 while being discharged from a dispenser. Specifically, as shown in FIG. 5, the dispenser firstly applies sealing member 108 to starting end groove 143 which is distanced from second fitting portion 142. Next, the dispenser discharges sealing member 108 while shifting relative to base body 104 so as to approach second fitting portion 142, whereby the groove is filled with sealing member 108. When the dispenser reaches second fitting portion 142, the dispenser turns around along second fitting portion 142 while discharging sealing member 108, and again arrives at distant portion 147. Finally, the dispenser stops discharging sealing member 108 in the state escaped to terminating end groove 144 from second fitting portion 142.

Thus, second fitting portion 142 can be filled with sealing member 108 over the entire circumference without any breaks, and high liquidtightness can be secured.

Next, the speaker unit assembled in advance is attached to base body 104 so that first fitting portion 121 fits with second fitting portion 142 having edge 103 interposed therebetween. First fitting portion 121 and second fitting portion 142 are not completely fitted with each other, but fitted with each other to leave a clearance just enough to be filled with sealing member 108.

Here, as shown in FIGS. 3 and 4, second fitting portion 142 includes sloped sidewall 149 that become farther from diaphragm 101 toward the open end (in the drawings, the positive direction in Z-axis) into which first fitting portion 121 is fitted. Thus, sealing member 108 is pushed away toward the outer side than the inner side of first fitting portion 121. This can avoid impairment of the acoustic characteristic that may otherwise be caused by any disadvantageous influence on edge 103 by sealing member 108 oozed out on the inner side.

Further, dispenser passes over the end of distant portion 147 twice, sealing member 108 is applied to distant portion 147 by a greater amount than to outer circumferential portion 146. However, the distance between the portion applied with a greater amount of sealing member 108 and diaphragm 101 is greater than the distance between other portion and diaphragm 101. Accordingly, provided that sealing member 108 is oozed out on the inner side of first fitting portion 121 at the end of distant portion 147, a great influence on the acoustic performance can be avoided.

Finally, by tightening base body 104 and frame 102 with not-shown tightening members such as bolts, loudspeaker 100 is manufactured.

1-2. Effects and Others

As described above, in the present exemplary embodiment, an electroacoustic transducer is an electroacoustic transducer that converts electric signal into sounds and vice versa. The electroacoustic transducer includes: a diaphragm; a frame that is disposed around the diaphragm so as to surround the diaphragm; an edge that closes a space between the diaphragm and the frame in a manner of forming a membrane so as to connect the diaphragm and the frame; a base body that supports the frame and has a through sound output hole in front of the diaphragm; a magnet that is attached to the frame; and a voice coil body that is attached to the diaphragm. The frame has an annular first fitting portion that is disposed around the diaphragm so as to surround the diaphragm. The base body has a second fitting portion that fits with the first fitting portion. The electroacoustic transducer further includes a sealing member that is made of a thermoplastic substance and seals a space between the first fitting portion and the second fitting portion fitted with each other.

Note that, loudspeaker 100 is an example of the electroacoustic transducer. Diaphragm 101 is an example of the diaphragm. Frame 102 is an example of the frame. Edge 103 is an example of the edge. Sound output hole 141 is an example of the sound output hole. Base body 104 is an example of the base body. Magnet 105 is an example of the magnet. Voice coil body 106 is an example of the voice coil body. First fitting portion 121 is an example of the first fitting portion. Second fitting portion 142 is an example of the second fitting portion. Sealing member 108 is an example of the sealing member.

For example, in the example shown in the first exemplary embodiment, loudspeaker 100 includes: diaphragm 101; frame 102 that is disposed around diaphragm 101 so as to surround diaphragm 101; edge 103 that closes a space between diaphragm 101 and frame 102 in a manner of forming a membrane so as to connect diaphragm 101 and frame 102; base body 104 that supports frame 102 and has through sound output hole 141 in front of diaphragm 101; magnet 105 that is attached to frame 102; and voice coil body 106 that is attached to diaphragm 101. Frame 102 has annular first fitting portion 121 that is disposed around diaphragm 101 so as to surround diaphragm 101. Base body 104 has second fitting portion 142 that fits with first fitting portion 121. Loudspeaker 100 further includes sealing member 108 that is made of a thermoplastic substance and seals a space between first fitting portion 121 and second fitting portion 142 fitted with each other.

In the electroacoustic transducer, each of the first fitting portion and the second fitting portion may include an outer circumferential portion that is disposed along a circumferential portion of the diaphragm, and a distant portion that is disposed to be farther from the diaphragm than the outer circumferential portion is.

Note that, outer circumferential portion 126 is an example of the outer circumferential portion of the first fitting portion. Outer circumferential portion 146 is an example of the outer circumferential portion of the second fitting portion. Distant portion 127 is an example of the distant portion of the first fitting portion. Distant portion 147 is an example of the distant portion of the second fitting portion.

For example, in the example shown in the first exemplary embodiment, in loudspeaker 100, first fitting portion 121 includes outer circumferential portion 126 that is disposed along the circumferential portion of diaphragm 101, and distant portion 127 that is disposed to be farther from diaphragm 101 than outer circumferential portion 126 is. Second fitting portion 142 includes outer circumferential portion 146 that is disposed along the circumferential portion of diaphragm 101, and distant portion 147 that is disposed to be farther from diaphragm 101 than outer circumferential portion 146 is.

In the electroacoustic transducer, the diaphragm and the edge may be integrated with each other.

For example, in the example shown in the first exemplary embodiment, in loudspeaker 100, diaphragm 101 and edge 103 are integrated with each other.

In the electroacoustic transducer, the edge may have a shape spreading to be clamped between the first fitting portion and the second fitting portion over an entire circumference of the first fitting portion and the second fitting portion.

For example, in the example shown in the first exemplary embodiment, in loudspeaker 100, edge 103 has a shape spreading to be clamped between first fitting portion 121 and second fitting portion 142 over the entire circumference of first fitting portion 121 and second fitting portion 142.

In the electroacoustic transducer, a lead wire connected to the voice coil body may be arranged from inside the distant portion to outside the frame.

Note that, lead wire 161 is an example of the lead wire.

For example, in the example shown in the first exemplary embodiment, in loudspeaker 100, lead wire 161 connected to voice coil body 106 is arranged from inside distant portion 127 to outside frame 102.

In the electroacoustic transducer, at the frame on the diaphragm side near the second fitting portion, a draw-out hole through which the lead wire connected to the voice coil body is drawn out may be provided.

Note that, draw-out hole 124 is an example of the draw-out hole.

For example, in the example shown in the first exemplary embodiment, in loudspeaker 100, at frame 102 on the diaphragm 101 side near second fitting portion 142, draw-out hole 124 through which lead wire 161 connected to voice coil body 106 is drawn out is provided.

In the electroacoustic transducer, the second fitting portion may be groove-like. The base body may include a starting end groove and a terminating end groove that communicate with the second fitting portion at the distant portion of the second fitting portion.

Note that, starting end groove 143 is an example of the starting end groove. Terminating end groove 144 is an example of the terminating end groove.

For example, in the example shown in the first exemplary embodiment, in loudspeaker 100, second fitting portion 142 is groove-like. Base body 104 includes starting end groove 143 and terminating end groove 144 that communicate with second fitting portion 142 at distant portion 147 of second fitting portion 142.

In the electroacoustic transducer, the first fitting portion or the second fitting portion may be a groove that includes a sloped sidewall that becomes farther from the diaphragm as becoming closer to an open end.

Note that, sloped sidewall 149 is an example of the sloped sidewall.

For example, in the example shown in the first exemplary embodiment, in loudspeaker 100, second fitting portion 142 is a groove that includes sloped sidewall 149 that becomes farther from diaphragm 101 as becoming closer to an open end.

For example, with a conventional technique as disclosed in PTL 1, in securing the waterproof performance by a compressed rubber gasket or the like, complication in the structure and an increase in the number of components and manufacturing steps are invited. Further, since an annular rubber gasket must be evenly compressed, the frame and the base body must have stiffness to some extent, which hinders a reduction in weight. Further, when the rubber gasket is bonded with an adhesive agent, replacement of the component becomes difficult.

However, the electroacoustic transducer structured as described above can exhibit waterproof performance with a simpler structure as compared to the conventional technique. For example, with loudspeaker 100, easier manufacture, reduced costs, and reduced weight of frame 102 can be achieved. Further, entry of liquid from base body 104 side toward the back side of diaphragm 101 can be prevented, and entry of liquid from sound output hole 141 toward magnet 105 can be prevented.

Second Exemplary Embodiment

Subsequently, a description will be given of an exemplary embodiment of display apparatus 200 that includes an electroacoustic transducer such as loudspeaker 100 described in the first exemplary embodiment. Note that, in the second exemplary embodiment, any element (portion) having the operation and function or shape and mechanism and structure similar to those shown in the first exemplary embodiment may be denoted by like reference character, and the description may not be repeated. Further, in the following, the description will be given focusing on the difference from the first exemplary embodiment, and matters similar to the first exemplary embodiment may not be described.

2-1. Structure

Figure 6:
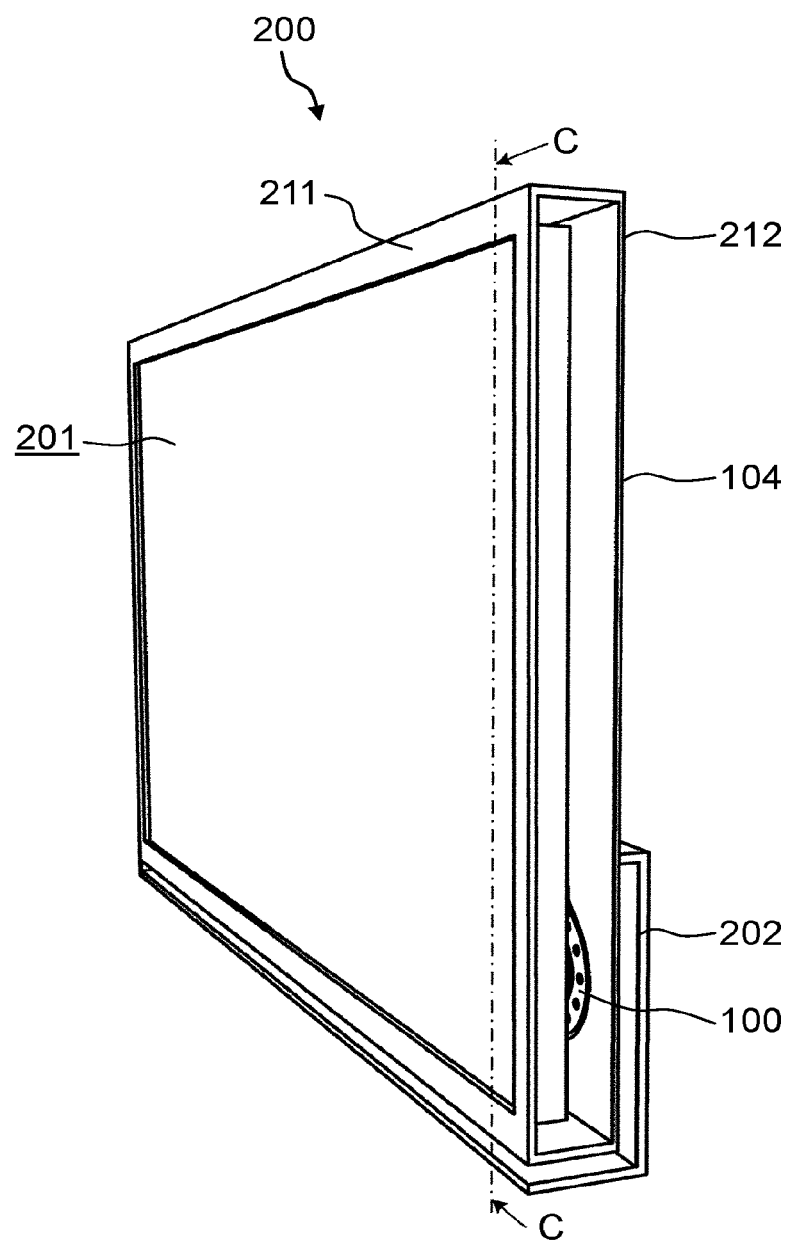
FIG. 6 is a perspective view showing a display apparatus according to a second exemplary embodiment with its end portion cut away.

FIG. 6 is a perspective view showing display apparatus 200 according to the second exemplary embodiment with its end portion cut away.

Figure 7:
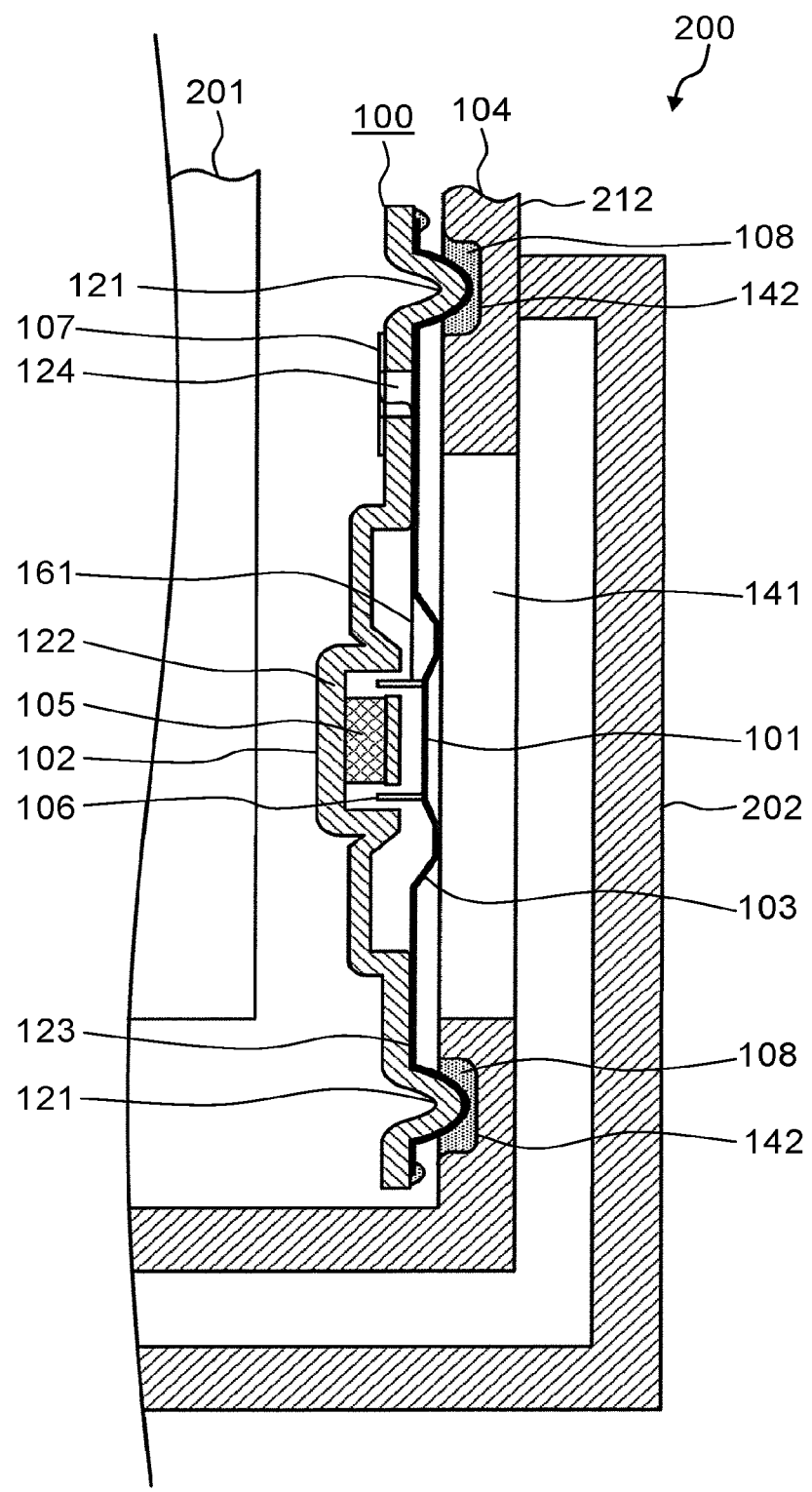
FIG. 7 is a cross-sectional view of the display apparatus taken along line C-C in FIG. 6.

FIG. 7 is a cross-sectional view of display apparatus 200 taken along line C-C in FIG. 6.

As shown in the drawings, display apparatus 200 is an apparatus capable of displaying still images or moving images, and emitting sounds. Display apparatus 200 is, for example, a portable television receiver, a tablet computer, a smartphone and the like. Display apparatus 200 includes display panel 201, echo board 202, base body 104, and loudspeaker 100.

Display panel 201 is an apparatus capable of displaying still images or moving images based on input video signals. Display panel 201 is, for example, a liquid crystal display panel or an organic electro luminescence display panel.

Base body 104 is one of the constituents of loudspeaker 100. In the present exemplary embodiment, base body 104 also holds display panel 201. In the present exemplary embodiment, base body 104 is quadrangular box-shaped. In base body 104, display panel 201 is attached to front surface portion 211, and loudspeaker 100 is attached to the bottom portion of back surface portion 212.

Note that, in base body 104, back surface portion 212 is removably attached to front surface portion 211. To back surface portion 212, two loudspeakers 100 and a plurality of devices are attached.

Echo board 202 is disposed on the side opposite to diaphragm 101 relative to sound output hole 141. Echo board 202 is a member that covers sound output hole 141 with a clearance from sound output hole 141. In the present exemplary embodiment, loudspeaker 100 emits sounds toward the back surface of display apparatus 200. Accordingly, without echo board 202, it is difficult to hear the sounds for the user watching display panel 201 from the front surface side. Echo board 202 echoes the sound emitted from loudspeaker 100 to the back surface, and leads the sounds through a sound path formed between echo board 202 and base body 104.

Further, in display apparatus 200, diaphragm 101 is not directly exposed outside by virtue of echo board 202. Thus, even if display apparatus 200 is splashed with liquid such as water, diaphragm 101 can be prevented from being directly brought into contact with liquid. Thus, waterproof performance of loudspeaker 100 can be improved.

2-2. Effects and Others

As described above, in the present exemplary embodiment, a display apparatus includes the electroacoustic transducer, and the base body holds a display panel.

Note that, display apparatus 200 is an example of the display apparatus. Loudspeaker 100 is an example of the electroacoustic transducer. Base body 104 is an example of the base body. Display panel 201 is an example of the display panel.

For example, in the example shown in the second exemplary embodiment, display apparatus 200 includes loudspeaker 100, and base body 104 holds display panel 201.

In the electroacoustic transducer, an echo board may be attached to the base body on a side opposite to the diaphragm with reference to the sound output hole so as to cover the sound output hole while leaving a clearance.

Note that, echo board 202 is an example of the echo board.

For example, in the example shown in the second exemplary embodiment, in loudspeaker 100, echo board 202 is attached to base body 104 on a side opposite to diaphragm 101 with reference to sound output hole 141 so as to cover sound output hole 141 while leaving a clearance.

Display apparatus 200 according to the second exemplary embodiment structured as described above can implement display apparatus 200 with high waterproof performance.

Further, display apparatus 200 can allow the user watching display panel 201 from the front surface side to easily hear the sounds emitted from loudspeaker 100 toward the back surface of display apparatus 200.

Further, in the case where groove-like second fitting portion 142 is provided to back surface portion 212 being part of base body 104 of display apparatus 200, and an attaching groove for other device to be attached is also provided at back surface portion 212, sealing member 108 can be continuously applied to the grooves at back surface portion 212. Thus, the efficiency in manufacturing display apparatus 200 can be improved.

Other Exemplary Embodiments

In the foregoing, as illustrations of the technique of the present disclosure, the first and second exemplary embodiments have been described. The accompanying drawings and the detailed description have been provided therefor.

Accordingly, constituents shown in the accompanying drawings and the detailed description may include not only the constituents essential for solving the problem, but also the constituents not being essential for solving the problem but being intended to illustrate the technique. Therefore, one should not immediately find that those non-essential constituents are essential based on the fact that such non-essential constituents are disclosed in the accompanying drawings and the detailed description.

As described above, the present disclosure is not limited to the exemplary embodiments. For example, by arbitrarily combining the constituents disclosed in the specification or omitting some constituents, another exemplary embodiment of the present disclosure may be formed. Further, the present disclosure also includes any variation obtained from various modifications to the exemplary embodiments that can be contemplated by a person skilled in the art within a range not departing from the spirit of the present disclosure, that is, from the meaning of languages in the scope of claims.

Accordingly, in the following, other exemplary embodiments are shown.

For example, in the exemplary embodiments above, configuration example where first fitting portion 121 is a projection and second fitting portion 142 is a groove is described. However, the projection and the groove may be replaced by each other.

Further, in the exemplary embodiments above, configuration example where diaphragm 101 and edge 103 are integrated with each other is described. On the other hand, diaphragm 101 and edge 103 may be separate members. In this case, diaphragm 101 and edge 103 may be bonded to each other with an adhesive agent, or welded to each other.

Still further, in the exemplary embodiments above, loudspeaker 100 is shown as one example of the electroacoustic transducer. On the other hand, the electroacoustic transducer may be a microphone or a sensor that converts sounds into electric signals.

Still further, in the exemplary embodiments above, it is described that diaphragm 101, magnet 105, and voice coil body 106 are circular in a plan view. On the other hand, they are not limited to such a shape. These members may be oval or quadrangular in a plan view.

Still further, the magnetic circuit is not limited to an inner magnet type magnetic circuit. The magnetic circuit may be of the outer magnet type, or may employ a combination of the inner magnet type and the outer magnet type.

Still further, magnet 105 may be any magnet such as a samarium-iron-based magnet, a ferrite-based magnet and the like.

Figure 8:
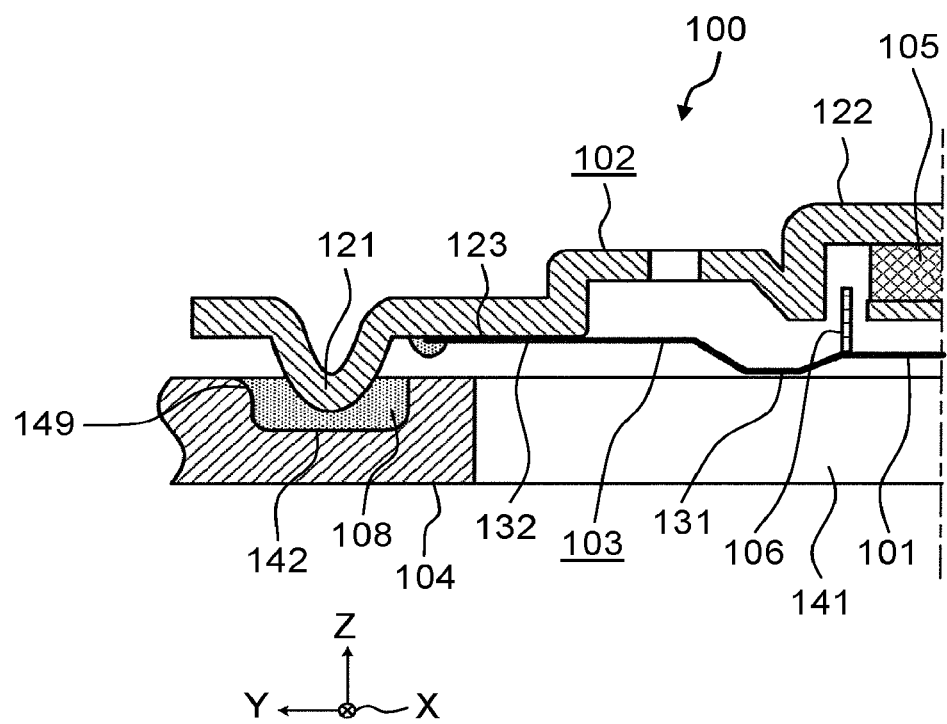
FIG. 8 is a cross-sectional view showing an exemplary loudspeaker according to other exemplary embodiment.

FIG. 8 is a cross-sectional view showing an exemplary loudspeaker according to other exemplary embodiment. For example, as shown in FIG. 8, despite edge 103 not being clamped between first fitting portion 121 and second fitting portion 142, diaphragm 101, edge 103, frame 102, and sealing member 108 can prevent entry of liquid from sound output hole 141 toward the magnet side. In this case, since liquid is directly brought into contact with frame 102, frame 102 is desirably made of a stable substance withstanding the liquid being brought into contact therewith. For example, when the liquid is water, frame 102 may be made of resin or the like.

The exemplary embodiments above are merely illustrations of the technique of the present disclosure. Therefore, they can be subjected to various modifications, replacement, addition or omission within the scope of claims or an equivalent thereof.

INDUSTRIAL APPLICABILITY

The present disclosure is applicable to an electroacoustic transducer and a display apparatus. The electroacoustic transducer and the display apparatus according to the present disclosure can be used in the situation where they are exposed to water, such as outdoors or in bathrooms.

REFERENCE MARKS IN THE DRAWINGS

100: loudspeaker
101: diaphragm
102: frame
103: edge
104: base body
105: magnet
106: voice coil body
107: electrode substrate
108: sealing member
121: first fitting portion
122: magnet holder
123: edge holder
124: draw-out hole
125: through hole
126, 146: outer circumferential portion
127, 147: distant portion
131: bulging portion
132: plane portion
141: sound output hole
142: second fitting portion
143: starting end groove
144: terminating end groove
149: sloped sidewall
161: lead wire
171: electrode
200: display apparatus
201: display panel
202: echo board
211: front surface portion
212: back surface portion

The invention claimed is:

1. An electroacoustic transducer comprising:
a diaphragm;
a frame that is disposed around the diaphragm;
an edge that connects the diaphragm and the frame to each other;
a base body that supports the frame;
a magnet that is attached to the frame; and
a voice coil body that is attached to the diaphragm, wherein
the frame has an annular first fitting portion that is disposed around the diaphragm so as to surround the diaphragm, the first fitting portion is an annular projection projecting toward the base body,
the base body has a second fitting portion that fits with the first fitting portion, the second fitting portion is an annular groove that opens toward the frame, and
the electroacoustic transducer further comprises
a sealing member that seals a space between the first fitting portion and the second fitting portion fitted with each other.

2. The electroacoustic transducer according to claim 1, wherein
the first fitting portion and the second fitting portion each include
an outer circumferential portion that is disposed along a circumferential portion of the diaphragm, and
a distant portion that is disposed to be farther from the diaphragm than the outer circumferential portion is.

3. The electroacoustic transducer according to claim 1, wherein the diaphragm and the edge are integrated with each other.

4. The electroacoustic transducer according to claim 1, wherein the edge has a shape spreading to be clamped between the first fitting portion and the second fitting portion over an entire circumference of the first fitting portion and the second fitting portion.

5. The electroacoustic transducer according to claim 1, wherein
the first fitting portion and the second fitting portion each include
an outer circumferential portion that is disposed along a circumferential portion of the diaphragm, and
a distant portion that is disposed to be farther from the diaphragm than the outer circumferential portion is; and
the frame includes a draw-out hole which is provided at near the distant portion of the second fitting portion and through which a lead wire connected to the voice coil body passes.

6. The electroacoustic transducer according to claim 1, wherein
the first fitting portion and the second fitting portion each include an outer circumferential portion that is disposed along a circumferential portion of the diaphragm, and a distant portion that is disposed to be farther from the diaphragm than the outer circumferential portion is; and the base body includes a starting end groove and a terminating end groove that communicate with the second fitting portion at the distant portion of the second fitting portion.

7. The electroacoustic transducer according to claim 1, wherein the second fitting portion includes a sloped sidewall that becomes farther from the diaphragm as becoming closer to an open end.

8. The electroacoustic transducer according to claim 1, wherein an echo board that echoes a sound emitted from the diaphragm is attached to the base body.

9. A display apparatus comprising the electroacoustic transducer according to claim 1, wherein the base body holds a display panel.

10. The display apparatus according to claim 9, wherein an echo board that echoes a sound emitted from the diaphragm is attached to the base body.

11. An electroacoustic transducer that converts a sound into an electric signal, comprising:

a diaphragm;

a frame that is disposed around the diaphragm;

an edge that connects the diaphragm and the frame to each other;

a base body that supports the frame;

a magnet that is attached to the frame; and a voice coil body that is attached to the diaphragm, wherein the frame has an annular first fitting portion that is disposed around the diaphragm so as to surround the diaphragm, the first fitting portion is an annular projection projecting toward the base body, the base body has a second fitting portion that fits with the first fitting portion, the second fitting portion is an annular groove that opens toward the frame, and the electroacoustic transducer further comprises:

a sealing member that seals a space between the first fitting portion and the second fitting portion fitted with each other.

* * * * *